Feb. 13, 1934.   F. W. BAKER   1,946,661
FLEXIBLE DRIVING MECHANISM
Filed Jan. 20, 1928
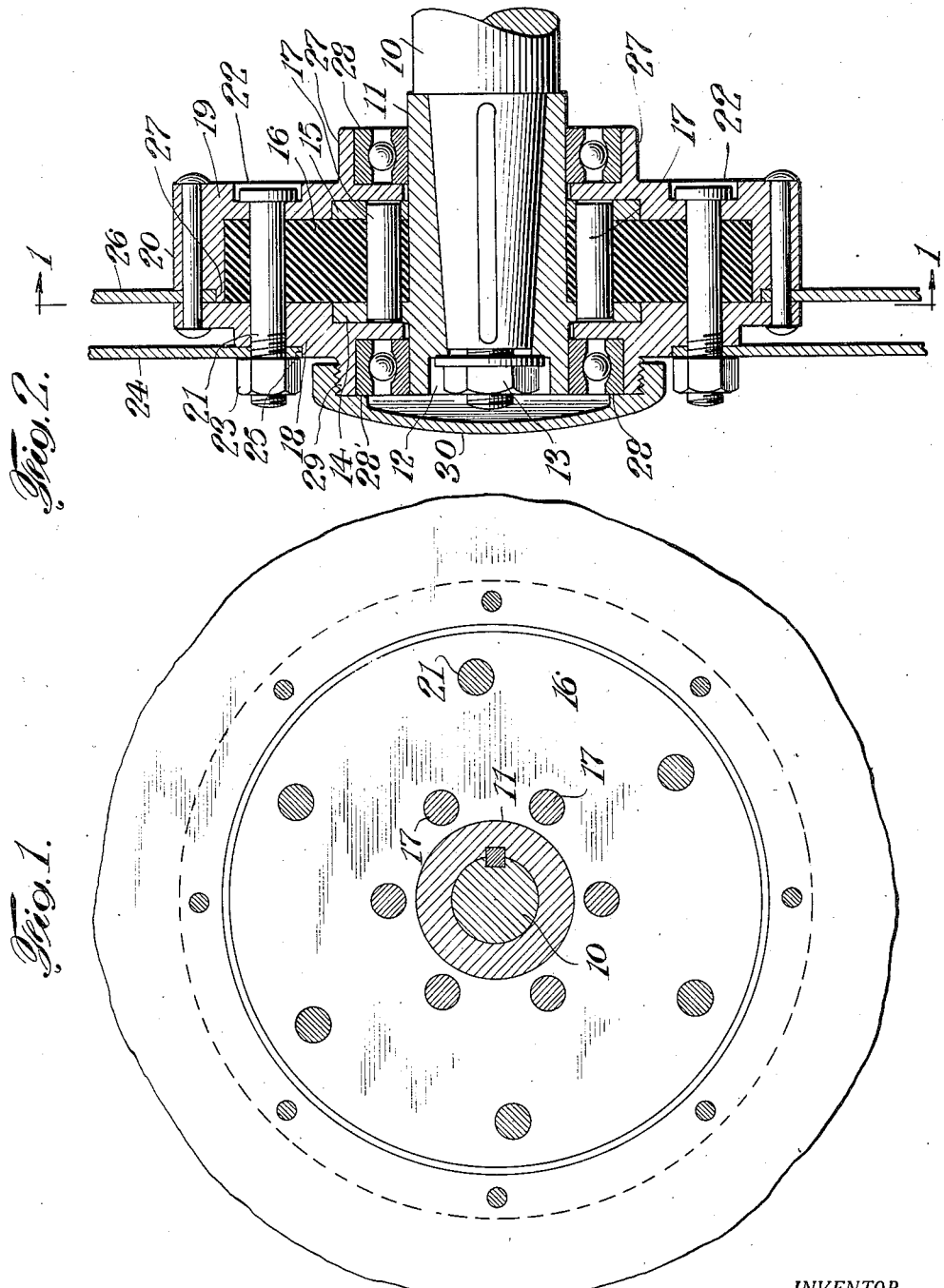
INVENTOR.
Frederick W. Baker,
BY Hoguet & Weary.
ATTORNEYS.

Patented Feb. 13, 1934

1,946,661

UNITED STATES PATENT OFFICE 1,946,661

FLEXIBLE DRIVING MECHANISM

Frederick William Baker, Stourbridge, England, assignor to Trinity Wheel Corporation, New York, N. Y., a corporation of New York Application January 20, 1928. Serial No. 248,020

8 Claims. (Cl. 64—100)

My invention relates to improvements in flexible driving mechanisms, and particularly to such as are adapted for use in the wheels of motor vehicles, although the mechanism can be applied to other purposes. The object of the invention is to interpose a resilient mass of yielding material between the rotary driving and driven members, to confine the mass so that it cannot be distorted superficially to any appreciable extent, and to dispose of it and its connected parts in such a way that the transmission of power from the driving to the driven member must be through the yielding mass. I also prefer to arrange the driving and driven parts so that they will be spaced radially, connected by the flexible or yielding material, securely held in correct relative positions, and disposed so that the driving effort will be effectively through the yielding or resilient mass connecting the driving and driven parts. This particular invention relates to a special construction of this type, as I have shown and claimed a similar structure in a broader manner in another application for United States Patent Serial No. 248,019 filed simultaneously herewith.

Reference is to be had to the accompanying drawing forming a part of this specification, in which similar reference characters indicate corresponding parts in all the views.

Figure 1 is a sectional elevation of my invention on the line 1—1 of Figure 2, and Figure 2 is a vertical section taken on the axial line of the structure.

In the drawing I have shown the driving axle 10 as a part of the driving member, and while this might be any other type of shaft, still the preferred application of the invention is to a vehicle wheel, and I have shown it as thus applied. The axle 10 is keyed to a sleeve or hub member 11 which at its outer end is recessed as at 12 to receive a nut 13 connecting with the reduced threaded end of the axle, and the nut serves to hold the member 11 on the axle. The arrangement thus described is conventional, and the parts 10 and 11 can be connected in any other approved way. The hub member 11 is shown with a circumferential flange 14 rigid on the member 11 and spaced apart from this is a similar flange 15 which is shown as removable, in order that the driving resilient mass or element 16 can be conveniently seated between the flanges 14 and 15 and project circumferentially from the member 11. The driving means 16 may be rubber, rubberized fabric, or any suitable resilient material of this nature. It fits snugly between the flanges 14 and 15 projecting outwardly therefrom, and is held by transverse pins 17 which may be drive-fitted into flanges 14 or 15 or both or equivalent fastening elements. Thus the members 10, 11 and 16 will constitute essentially the driving member of the structure.

For convenience the driven member is shown as a two-part housing comprising the members 18 and 19, the latter having a circumferential flange 20 abutting with the member 18 so that the parts 18, 19 and 20 house in and enclose the mass 16. The opposed parts 18 and 19 can be clamped together by any suitable means, as for example and preferably, by the through bolts 21, the heads of which are preferably countersunk in the member 19 as shown at 22, while the opposed ends are provided with nuts 23. These bolts and nuts can also be made to secure the driven member to a wheel disc 24 or other structure to be rotated, and the disc has its inner edge seated on the shoulder 25. The parts 18, 19 are shaped to seat over and fit snugly against the flanges 14 and 15, so as to bind these securely against the mass 16, and the driven member has projecting parts 27 and 29 serving to receive the bearings 28 and 28' which lie between the parts 18 and 19 of the driven member and the part 11 of the driving member. Any suitable easy running bearings can be used, and it is desirable to have bearings at opposite sides of the driving mass 16 to prevent the structure from wobbling. The annular flange 29 above referred to can be screw threaded on its outer part to receive a cap 30 of conventional design to cover the end of the structure.

It will be noticed by reference to Figure 1 that the fastening elements 17 and 21 do not radially align, and when a driving effort is imparted to the member 10 and connected parts, the first theoretical movement of said parts will not move the mass 16 at all, but the effort will be taken up by the yielding of the mass and this will tend to be compressed or wedged between every member 17 and 21 without regard to the direction in which the member 10 turns. In other words the element 17 will tend to wedge a part of the mass 16 between itself and the next adjacent element 21. At the same time a gradual turning movement will be imparted to the driven member through the mass until the point of maximum compression is reached, after which the movement will be constant, and the speed of rotation will be the same in the driving and driven parts. Until such point is reached, however, it will be noticed that the driving mechanism acts as a change speed drive, and the full driving speed from the part 10 will not be transmitted to the driven member until the point of compression is reached.

It will be further noticed that the parts 18 and 19 of the driven member, and the parts 14 and 15 of the driving member serve to hold the mass 16 against distortion so that the driving effort is transmitted wholly through the said mass, and the driven member will turn easily on the bearings 28 and 28'.

I claim:

1. The combination with a vehicle wheel and a driving axle for said wheel of a hub unit for connecting said wheel to said driving axle, said hub unit comprising a wheel receiving member and an axle engaging member, means on said wheel receiving member for detachably mounting said wheel, means on said axle engaging member for detachably securing same to said driving axle, means for holding said wheel receiving member and said axle engaging member against relative lateral movement with respect to each other, means for supporting said wheel receiving member with respect to said axle engaging member to adapt said members for relative circumferential movement with respect to each other and for maintaining said wheel receiving member and said axle engaging member in concentric relationship when said wheel receiving member is carrying a load, and means including a resilient non-metallic mass between said wheel receiving member and said axle engaging member for resiliently transmitting torsional driving stresses directly from said axle engaging member to said wheel receiving member through said resilient mass.

2. A hub unit comprising a wheel receiving member and an axle engaging member, means on said wheel receiving member for detachably connecting a wheel, means on said axle engaging member for detachably securing the same to a driving axle, means for holding said wheel receiving member and said axle engaging member against relative lateral movement with respect to each other, means for supporting said wheel receiving member with respect to said axle engaging member to adapt said members for relative circumferential movement with respect to each other and for maintaining said wheel receiving member and said axle engaging member in concentric relationship when said wheel receiving member is carrying a load, and means including a resilient non-metallic mass between said axle engaging member and said wheel receiving member for resiliently transmitting torsional driving stresses directly from said axle engaging member to said wheel receiving member through said resilient mass.

3. A hub unit comprising a wheel receiving member and an axle engaging member, means on said wheel receiving member for detachably connecting a wheel, means on said axle engaging member for detachably securing the same to a driving axle, means for holding said wheel receiving member and said axle engaging member against relative lateral movement with respect to each other, means for supporting said wheel receiving member with respect to said axle engaging member to adapt said members for relative circumferential movement with respect to each other and for maintaining said wheel receiving member and said axle engaging member in concentric relationship when said wheel receiving member is carrying a load, and a resilient material disposed radially between said axle engaging member and said wheel receiving member for resiliently transmitting torsional driving stresses directly from said axle engaging member to said wheel receiving member.

4. A hub unit comprising a wheel receiving member and an axle engaging member, means on said wheel receiving member for detachably connecting a wheel, means on said axle engaging member for detachably securing the same to a driving axle, means for holding said wheel receiving member and said axle engaging member against relative lateral movement with respect to each other, means for supporting said wheel receiving member with respect to said axle engaging member to adapt said members for relative circumferential movement with respect to each other and for maintaining said wheel receiving member and said axle engaging member in concentric relationship when said wheel receiving member is carrying a load, and a resilient material disposed radially between said axle engaging member and said wheel receiving member and completely filling the space therebetween for resiliently transmitting torsional driving stresses directly from said axle engaging member to said wheel receiving member.

5. The combination with a vehicle wheel and a driving axle for said wheel of a hub unit for connecting said wheel to said driving axle, said unit including a resiliently driven wheel receiving member, a driving member on said axle, means on said wheel receiving member for detachably mounting said wheel, means for holding said wheel receiving member and the driving member on said axle against relative lateral movement with respect to each other, means for supporting said wheel receiving member with respect to said driving member on said axle to adapt said members for relative circumferential movement with respect to each other and for maintaining said wheel receiving member and said driving member on said axle in concentric relationship when said wheel receiving member is carrying a load, and means including a resilient non-metallic mass between said wheel receiving member and said driving member on said axle for resiliently transmitting torsional driving stresses directly from said driving member on said axle to said wheel receiving member through said resilient mass.

6. In combination, a hub unit including a resiliently driven wheel receiving member, an axle and a driving member thereon, means on said wheel receiving member for detachably connecting a wheel, means for holding said wheel receiving member and said driving member on said axle against relative lateral movement with respect to each other, means for supporting said wheel receiving member with respect to said driving member on said axle to adapt said members for relative circumferential movement with respect to each other and for maintaining said wheel receiving member and said driving member on said axle in concentric relationship when said wheel receiving member is carrying a load, and means including a resilient non-metallic mass between said driving member on said axle and said wheel receiving member for resiliently transmitting torsional driving stresses directly from said driving member on said axle to said wheel receiving member through said resilient mass.

7. In combination, a hub unit including a resiliently driven wheel receiving member, an axle and a driving member thereon, means forming a part of said unit for holding said wheel receiving member and said driving member on said axle against relative lateral movement with respect to each other, means on said wheel receiving member for detachably connecting a wheel, means for supporting said wheel receiving member with respect to said driving member on said axle to adapt said members for relative circumferential movement with respect to each other and for maintaining said wheel receiving member and said driving member on said axle in concentric relationship when said wheel receiving member is carrying a load, a resilient material disposed radially between said wheel receiving member and said driving member on said axle for resiliently transmitting torsional driving stresses directly from said driving member on said axle to said wheel receiving member.

8. In combination, a hub unit including a resiliently driven wheel receiving member, an axle and a driving member thereon, means on said wheel receiving member for detachably connecting a wheel, means for holding said wheel receiving member and said driving member on said axle against relative lateral movement with respect to each other, means for supporting said wheel receiving member with respect to said driving member on said axle to adapt said members for relative circumferential movement with respect to each other and for maintaining said wheel receiving member and said driving member on said axle in concentric relationship when said wheel receiving member is carrying a load and resilient material disposed radially between said driving member on said axle and said wheel receiving member for resiliently transmitting torsional driving stresses directly from said axle and through the driving member thereon to said wheel receiving member.

FREDERICK WILLIAM BAKER.